United States Patent
Massa et al.

(10) Patent No.: US 6,934,878 B2
(45) Date of Patent: Aug. 23, 2005

(54) FAILURE DETECTION AND FAILURE HANDLING IN CLUSTER CONTROLLER NETWORKS

(75) Inventors: Dieter Massa, Neckarsulm (DE); Otto Lehner, Neckarsulm (DE)

(73) Assignee: Intel Corporation, Santa Clara, CA (US)

( * ) Notice: Subject to any disclaimer, the term of this patent is extended or adjusted under 35 U.S.C. 154(b) by 496 days.

(21) Appl. No.: 10/104,839

(22) Filed: Mar. 22, 2002

(65) Prior Publication Data

US 2003/0182592 A1 Sep. 25, 2003

(51) Int. Cl.$^7$ ................................................ G06F 11/00
(52) U.S. Cl. ................................................ 714/5; 714/7
(58) Field of Search ............................ 714/5, 7

(56) References Cited

U.S. PATENT DOCUMENTS

| | | | | |
|---|---|---|---|---|
| 5,371,882 A | * | 12/1994 | Ludlam | 714/7 |
| 5,615,330 A | * | 3/1997 | Taylor | 714/7 |
| 5,712,970 A | * | 1/1998 | Arnott et al. | 714/6 |
| 5,720,028 A | * | 2/1998 | Matsumoto et al. | 714/9 |
| 6,119,244 A | * | 9/2000 | Schoenthal et al. | 714/4 |
| RE37,038 E | * | 1/2001 | Eastridge et al. | 714/5 |
| 6,317,844 B1 | * | 11/2001 | Kleiman | 714/6 |
| 6,330,687 B1 | * | 12/2001 | Griffith | 714/6 |
| 6,728,897 B1 | * | 4/2004 | Cramer et al. | 714/6 |
| 2002/0133735 A1 | * | 9/2002 | McKean et al. | 714/5 |

* cited by examiner

*Primary Examiner*—Bryce P. Bonzo
(74) *Attorney, Agent, or Firm*—Trop, Pruner & Hu, P.C.

(57) ABSTRACT

A cluster network may manage the detection and handling of failures in a cluster of RAID arrays by detecting failures and reconfiguring the cluster. A storage controller may interrogate its neighboring controller to determine if the neighboring controller is active.

12 Claims, 10 Drawing Sheets

FIG. 6

FAILURE DETECTION AND FAILURE HANDLING IN CLUSTER CONTROLLER NETWORKS

BACKGROUND

This invention relates generally to detecting and handling failures in a clustered array of mass storage devices such as an array of disk drives.

A redundant array of inexpensive disks (RAID) (called a "RAID array") is often selected as a mass storage for a computer system due to the array's ability to preserve data even if one of the disk drives of the array should fail. There are a number of RAID arrangements but most rely on redundancy to achieve a robust storage system. For example, RAID 1 systems may utilize a mirror disk drive for redundancy. In other RAID systems such as RAID 2–5 systems, data may be split, or stripped, across a plurality of disk drives such that if one disk drive fails, the data may still be recovered by using the information contained on the still working disk drives in the system. As an example, in a parity RAID system such as a RAID 2–5 system, if three disks are utilized to store data and associated parity information, if one disk fails, the data may be recovered from the still working two drives in the system. A system having a single disk drive may be considered a RAID 0 system even though the system provides no redundancy.

A RAID array may also be part of a cluster environment, an environment in which two or more file servers share one or more RAID arrays. Typically, for purposes of assuring data consistency, only one of these file servers accesses a particular RAID array at a time to modify data. In this manner, when granted exclusive access to the RAID array, a particular file server may perform read and write operations as necessary to modify data contained in the RAID array. After the particular file server finishes its access, then another file server may be granted exclusive access to modify data in a particular RAID array.

For purposes of establishing a logical-to-physical interface between the file servers and the RAID array, one or more RAID controllers typically are used. As examples of the various possible arrangements, a single RAID controller may be contained in the enclosure that houses the RAID array, or alternatively, each file server may have an internal RAID controller. In the latter case, each file server may have an internal RAID controller card that is plugged into a card connector slot of the file server. Alternatively, the server may have the RAID functionality contained on a main printed circuit board.

For the case where the file server has an internal RAID controller, the file server ("Server") is described herein as accessing the RAID array. However, it is understood that in these cases, it is actually the RAID controller card, or the RAID controller circuits on the main printed circuit board, of the server that is accessing the RAID array.

Before a particular server accesses a RAID array, the file server that currently is accessing the RAID array is responsible for closing all open read and write transactions. Hence, under normal circumstances, whenever a file server is granted access to a RAID array, all data on the shared disk drives of the array are in a consistent state.

In a clustering environment where different storage controllers access the same disk, the cluster operating system needs to guarantee data coherency and failure tolerance. Thus, there is a need for better ways to control the distribution of access rights, and for recovering from network failures, in clustered RAID networks.

DETAILED DESCRIPTION

Figure 1:
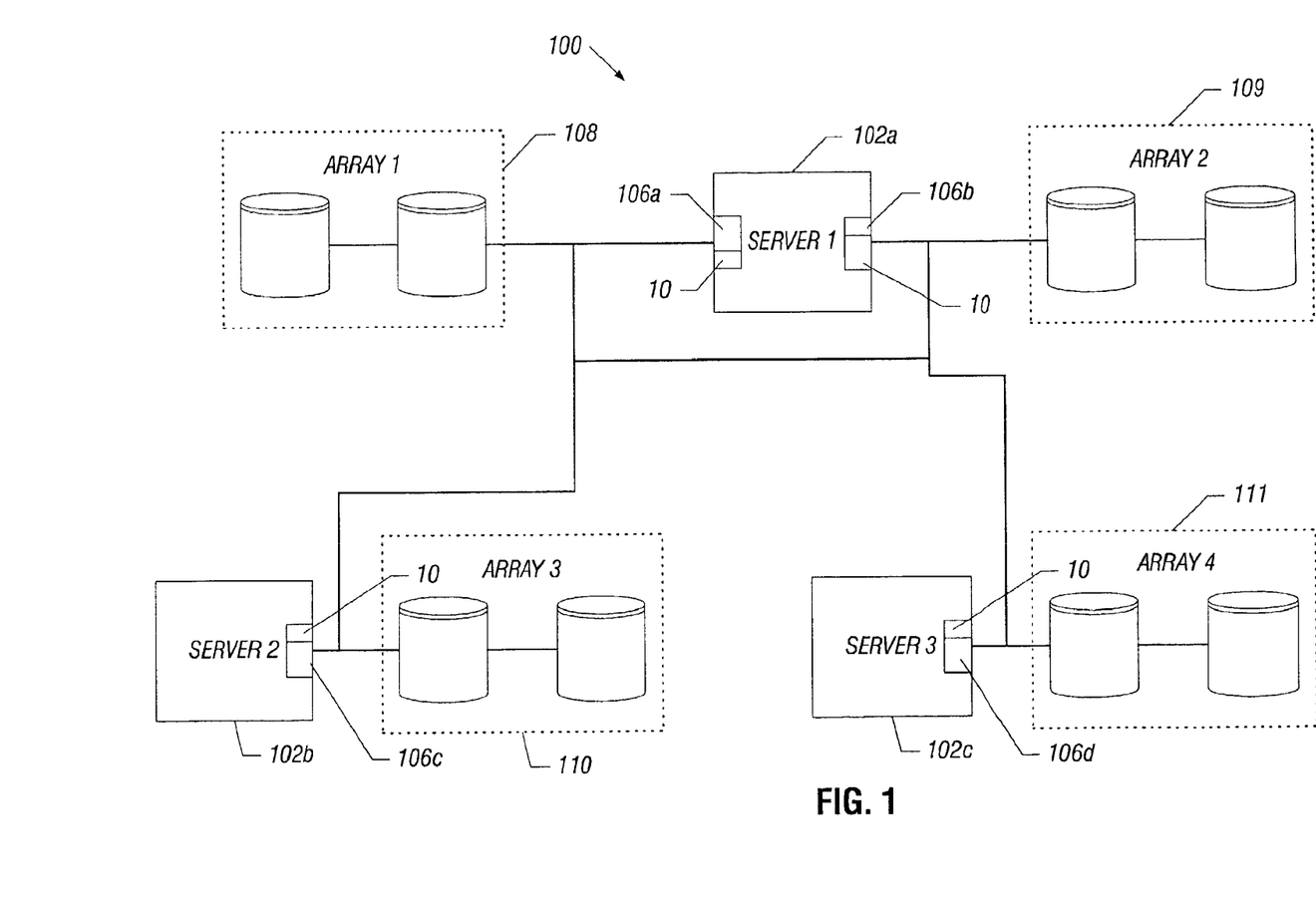
FIG. 1 is a block diagram of one embodiment of the present invention.

Referring to FIG. 1, a computer system 100, in accordance with one embodiment of the present invention, includes file servers 102 that are arranged in a cluster to share access to a clustered set of redundant array of inexpensive disks (RAID) array 108–111. Each server 102 performs an access to a RAID array 108–111 to the exclusion of the other servers 102. While an embodiment is illustrated with only three servers and four arrays, any number of servers and arrays may be utilized.

Each server 102 communicates with a RAID array 108–111 through a controller 106 that stores a software layer 10. In some embodiments, the controller 106 may be part of a server 102. In other embodiments, the controller 106 may be part of the RAID array 108–111. The controllers 106 may communicate with each other over a communications network. Also, while two controllers 106 *a*&*b* are illustrated associated with server 102*a*, a single controller having the ability to control two RAID arrays may be utilized instead.

Figure 2:
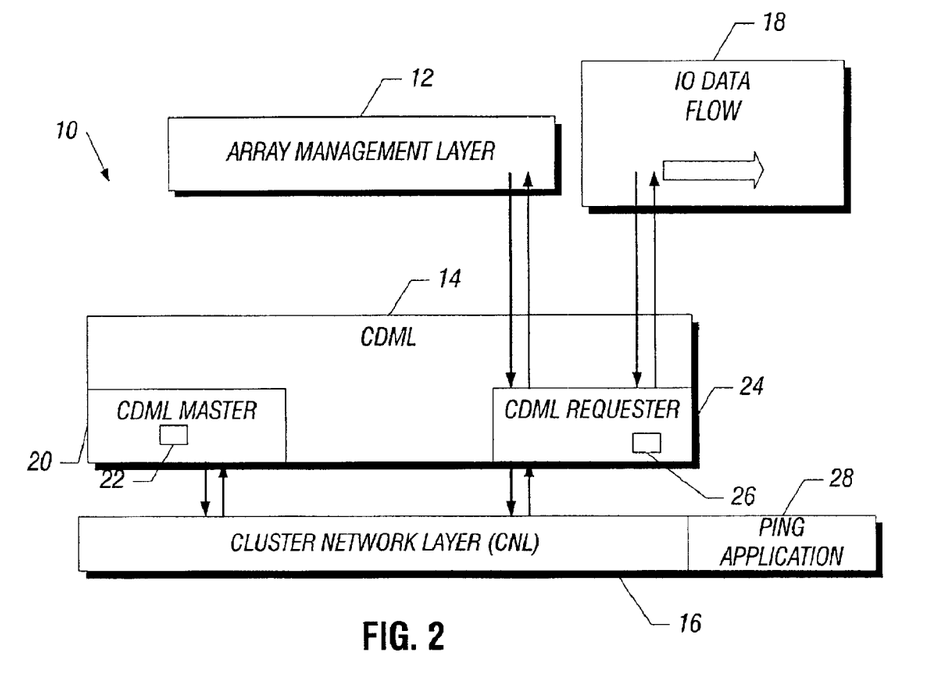
FIG. 2 is a depiction of software layers utilized in a controller in accordance with one embodiment of the present invention.

Referring to FIG. 2, the software layers 10 may include a cluster drive management layer (CDML) 14 that is coupled to a cluster network layer 16. The cluster network layer 16 may in turn be coupled to the various servers 102 and the RAID arrays 108–111. In addition, the cluster network layer 16 of one controller 106 may be coupled to the controllers 106 associated with other servers 102.

Coupled to the CDML 14 is an array management layer ("AML") 12. The cluster network layer ("CNL") 16 may be interfaced to all the other controllers 106 in the cluster 100. The CNL 16 may maintain login and logout of other controllers 106, intercontroller communication and may handle network failures. The CNL 16 may also provide the CDML 14 with communications services. The communications services may include handling redundant access to other controllers 106 if they are connected by more than one input/output channel.

A Ping Application ("PA") 28 may also be coupled to the CNL 16. The Ping Application 28 may communicate with one or more neighboring controllers 102 to detect a network failure. For example, the PA may "ping" the neighboring controller. If the proper response to the "ping" is not received, the PA may determine that the neighboring controller has gone inactive due to a failure or other cause. Communications for the PA 28 may be performed by the CNL 16 in some embodiments.

In the case of a login or a logout network event, the CNL 16 on a controller 106 logging in or out may call the CDML 14 to update its network information. In addition, the CNL may communicate changes to the PA 28. The CDML 14 is installed on every controller 106 in the cluster network 100. The CDML 14 knows all of the available controller 106 identifiers in the cluster network 100. These identifiers are reported through the cluster network layer 16. In addition, the CDML 14 is asynchronously informed of network changes by the cluster network layer 16. In one embodiment, the CDML 14 treats the list of known controllers 106 as a chain, where the local controller where the CDML is installed is always the last controller in the chain.

The generation of an access right called a token is based on a unique identifier in one embodiment of the present invention. This identifier may be the serial number of a requesting controller in one embodiment. For a particular RAID array 108–111, there may be two separate types of access rights generated that belong to the same unique identifier, distinguished by the CDML 14 by a sub-identifier within each access type. One sub-identifier may be reserved for array management (configuration access) and the other sub-identifier may be reserved for user data access.

The CDML 14 of each controller 106 includes two control processes. One is called the token master 20 and the other is called the token requester 24. The master 20 may not be activated on each controller 106 but the capability of operating as a token master may be provided to every controller 106 in some embodiments. In some embodiments, ensuring that each controller 106 may be configured as a master ensures a symmetric flow of CDML 14 commands, whether the master is available on a local or a remote controller 106.

Both the CDML master 20 and the CDML requester 24 handle the tasks for all access tokens needed in the cluster network 100. The administration of the tokens is done in a way that treats every token separately in some embodiments.

A requester 24 from one controller 106 communicates with a master 20 from another controller 106 by exchanging commands. Each command is atomic. For example, a requester 24 may send a command to the master 20 to obtain an access token. The commands are encapsulated, in one embodiment, so that the master 20 only confirms receipt of the command. The master 20 sends a response to the requester 24 providing the token in some cases. Thus, the protocol utilized by the CDML 14 may be independent from that used for transmission of other rights and data.

A CDML command may consist of a small data buffer and may include a token identifier, a subtoken identifier, a request type, a master identifier, a generation index which is an incremented counter and a forward identifier which is the identifier where the token has to be forwarded upon master request. All of the communications are handled by the cluster network layer 16 in one embodiment of the present invention.

For each RAID array 108–111, there is a master 20 that controls the distribution of access tokens and which is responsible for general array management. Whenever a controller 106 wants to access a RAID array 104, it requests the corresponding token from the corresponding master of the array being accessed. In some embodiments, any controller may be allowed to read an array identification without an access token. This ability may be helpful for a controller 106 or associated server 102 to recognize what RAID arrays are online.

When access is granted, a controller 106 can access the particular array 108–111 as long as needed. However, in some embodiments, when a request to transfer the access token is received, it should be accommodated as soon as possible. In other embodiments, a token transfer may be accommodated upon the controller having the token completing a minimum number of IO transactions. Upon dedicated shut down, each controller 106 may ensure that all tokens have been returned and the logout is completed.

Each controller 106 guarantees that the data is coherent before the token is transferred to another controller. In one embodiment, all of the mechanisms described are based on controller 106 to controller 106 communications. Therefore, each controller 106 advantageously communicates with all of the other controllers in the network 100. Each controller 106 may have a unique identifier in one embodiment to facilitate connections and communications between controllers 106.

Figure 3A:
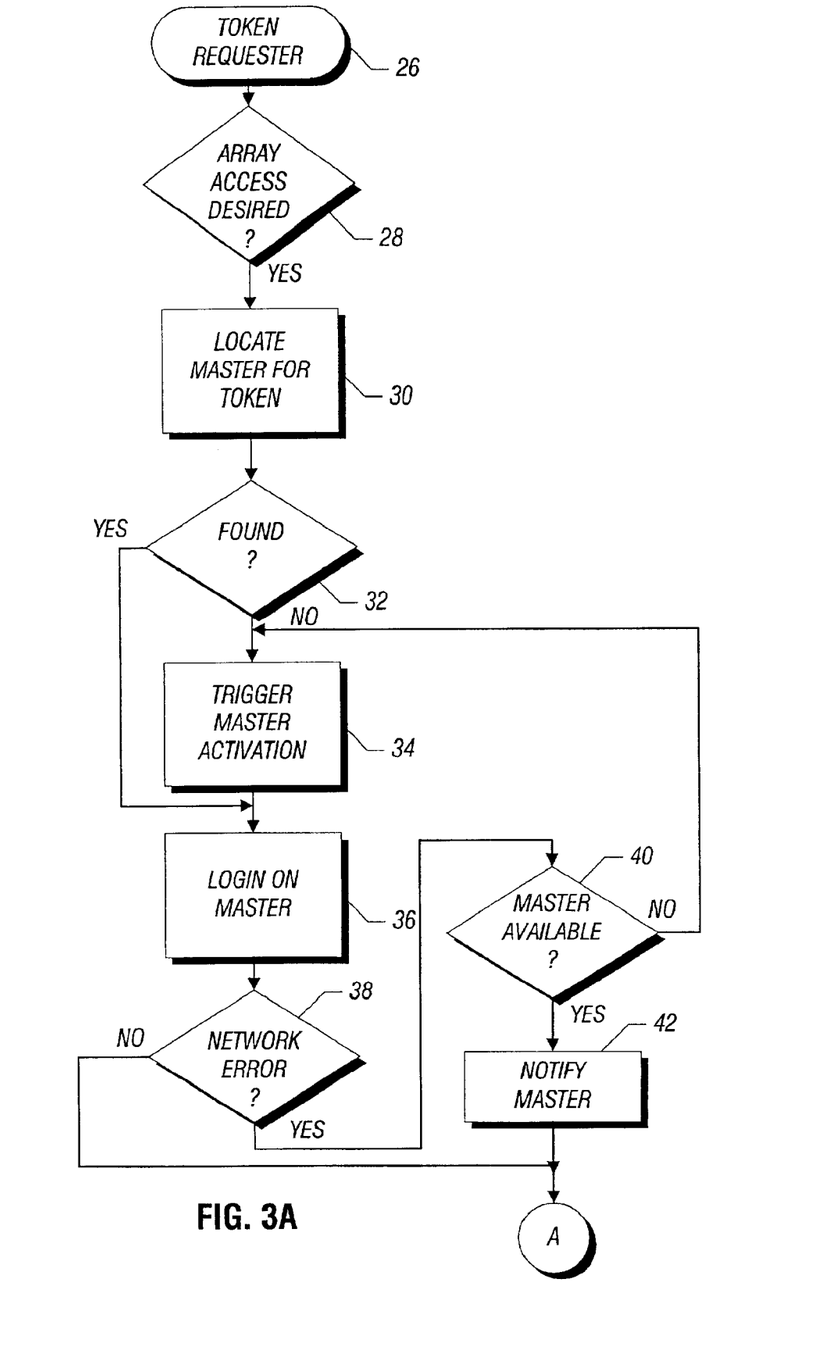
FIG. 3A is a flow chart for software utilized by a token requester in accordance with one embodiment of the present invention.

Referring to FIG. 3A, in one embodiment, the software 26 stored on a CDML requester 24 begins by determining whether the controller 106 on which the requester 24 is resident desires to access a RAID array 104, as indicated in diamond 28. If so, the requester 24 attempts to locate the master 20 for obtaining a token or access rights to the desired array, as indicated in block 30. If the master 20 is found, as determined in block 32, the requester logs in with the master as indicated in block 36. This generation activates the local master process for the master 20 that is in control of the particular array. Only one master 20 can be generated for a given token. If the master 20 is not found, the activation of a master can be triggered as indicated in block 34. Thereafter, the requester logs in with the appropriate master to receive a token as indicated in block 36.

A check at diamond 38 determines whether any network errors have occurred. One type of network failure may be the loss of a controller 106 that had logged in but not logged out. If so, a check at diamond 40 determines whether the master is still available. If so, the master is notified of the error because the master may be a remote controller 106. If there is no error, the flow continues.

Figure 3B:
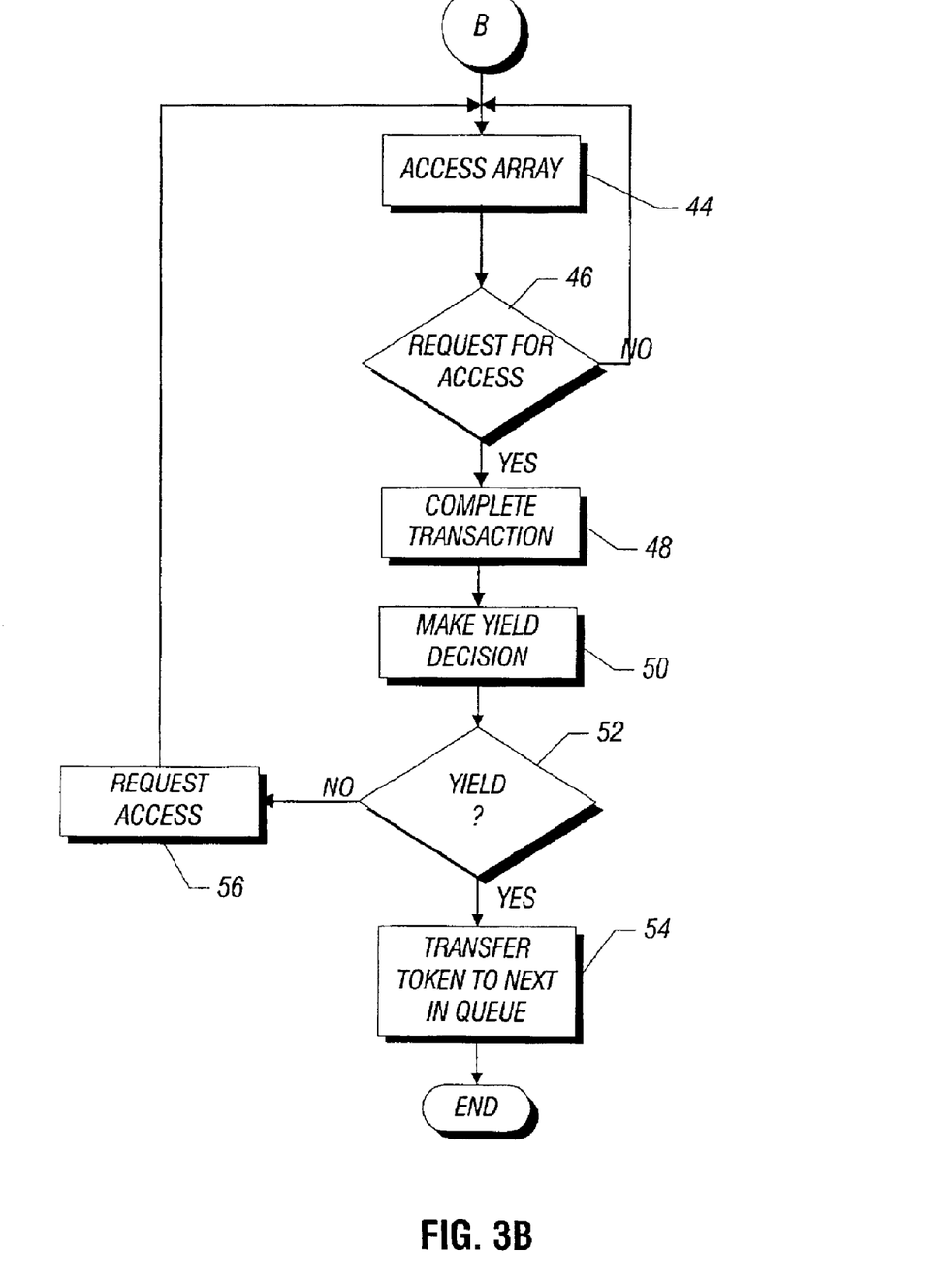
FIG. 3B is a continuation of the flow chart shown in FIG. 3A.

Referring to FIG. 3B, the flow continues by accessing the requested array, as indicated in block 44. A check at diamond 46 determines whether another controller 106 has requested access to the same array. If not, the process continues to access the array.

When a second controller requests access to an array 104 being accessed by a first controller including the requester 24, the requester 24 that was previously granted the token makes a decision whether to yield to the second requester as indicated in block 50. If the requester decides to yield as determined in diamond 52, the requester 24 attempts to complete the transaction, or series of transactions, as soon as possible as indicated in block 48. When the transaction is completed, the requester 24 transfers the access token to the next requester in the queue as indicated in block 54. Otherwise the requester 24 again requests access to complete one or more additional transactions as indicated in block 54.

Figure 3C:
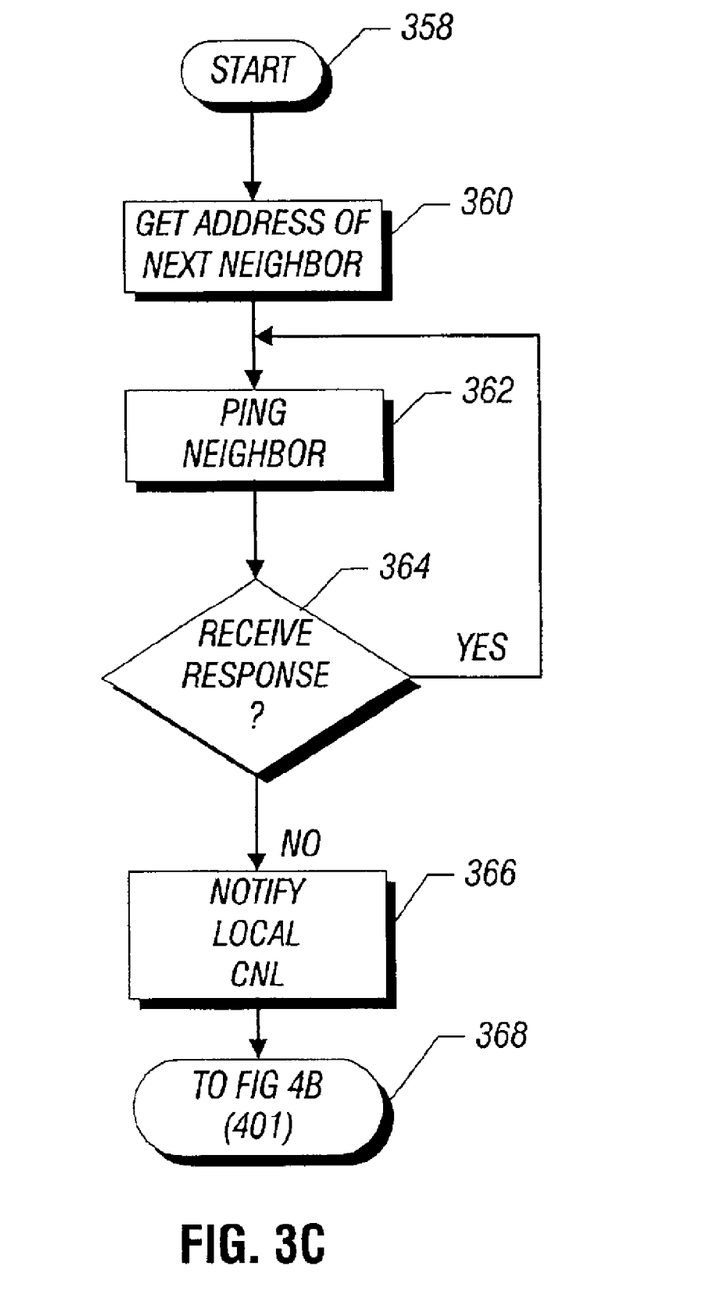
FIG. 3C is a flow chart of a functional block of FIG. 3A in accordance with one embodiment of the present invention.

Referring to FIG. 3C, a PA 28 may begin 358 by getting the address of a next neighbor controller 360. Then, a interrogation "ping" function may be performed where the "ping" function is a communication with the neighboring controller to determine if the neighboring controller is still functional. At decision tree 364, if the neighboring controller is still functional, then the process continues by looping back and pinging the neighbor again 362. There may be a delay between "pings" in some embodiments to prevent excess communications from occurring.

If at decision tree 364 the neighbor controller is determined to not be functional, for example it did not respond correctly to the "ping", then the local CNL may be notified 366. This notification may be by direct communication from the PA to the CNL in some embodiments. In other embodiments the PA may set a flag that may be read to determine a network error such as at 38 in FIG. 3A and 68 in FIG. 4A.

Figure 3D:
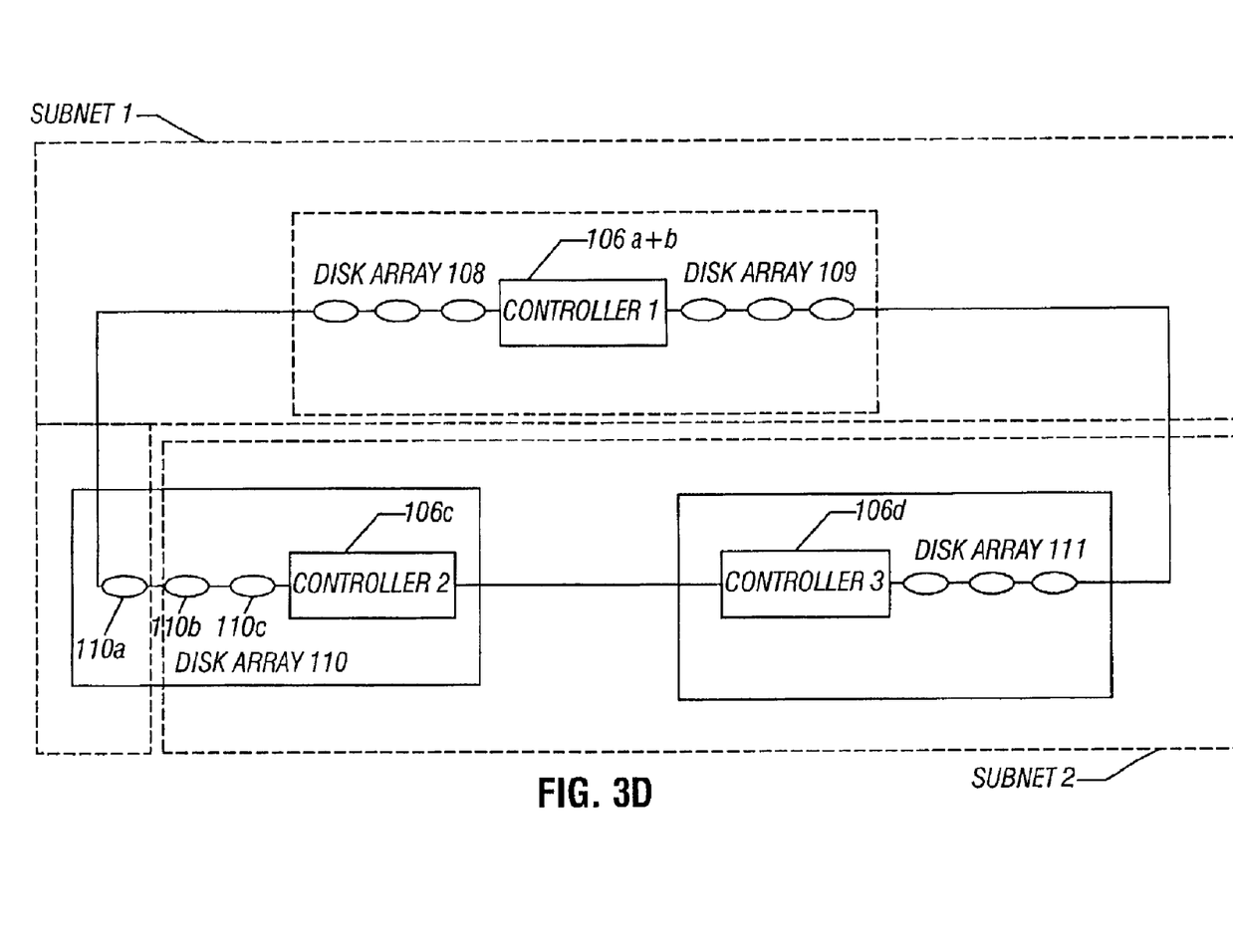
FIG. 3D is a block diagram of the physical connections between cluster controllers in accordance with one embodiment of the present invention.

Referring to FIG. 3D, a physical interconnection between controllers 106*a–d* is shown according to some embodiments. Controller 1 106*a*&*b* may send a signal to interrogate "ping" controller 2 106*c*. Controller 2 may "ping" controller 3 106*d* and controller 3 may "ping" controller 1 106*a*&*b*.

Should a network failure occur such as in an IO cable between two disks, at least one "ping" function will fail. For example an IO cable failure between disks 110*a* and 110*b*, as shown in FIG. 3D, will prevent the "ping" from controller 1 106*a*&*b* to controller 2 106*c* from being successful. Therefore, controller 1 will detect that a network failure has occurred.

If a network failure is detected, the controller that detected the failure checks which controllers are still available in the cluster and which controller, if any, is the new next neighbor. The PA is called to replace the next neighbor address and the CDML may be called to process the failure. One action taken by the CDML may be to request a disk array analysis from the array management layer.

Upon the detection of a network failure, the CDML may perform a disk array analysis to determine which disk arrays, if any, are still useable. Each array of drives may be checked by testing access to the member disks. If the network failure caused loss of a disk member of a non-redundant cluster drive, for example a single disk RAID 0 array, the drive is set to offline and any access to this drive is cancelled.

If the network failure caused a loss of more than one member disk of a redundant RAID 4 or RAID 5 disk array, the associated disk array is set to offline and any access to this array is cancelled. This is because data in a RAID 4 or RAID 5 system may not be recoverable in the event of multiple disk failures in the RAID array.

In the situation shown in FIG. 3D where only one disk 110*a* has failed in the RAID array 110, then the array 110 is still useable but is no longer redundant. In this case, disk array 110 may still be operable in subnet 2 while not operable in subnet 1. Although disk 110*a* may be accessible by controller 1, to prevent problems that may arise if components were made available again after repairing a failed cluster, only components may be utilized for which a master is available in the subnet. Since in this example disk 110*a* does not have a master in subnet 1 (the master may be 106*c* in subnet 2), disk 110*a* may not be made available to controller 1 in subnet 1.

Figure 4A:
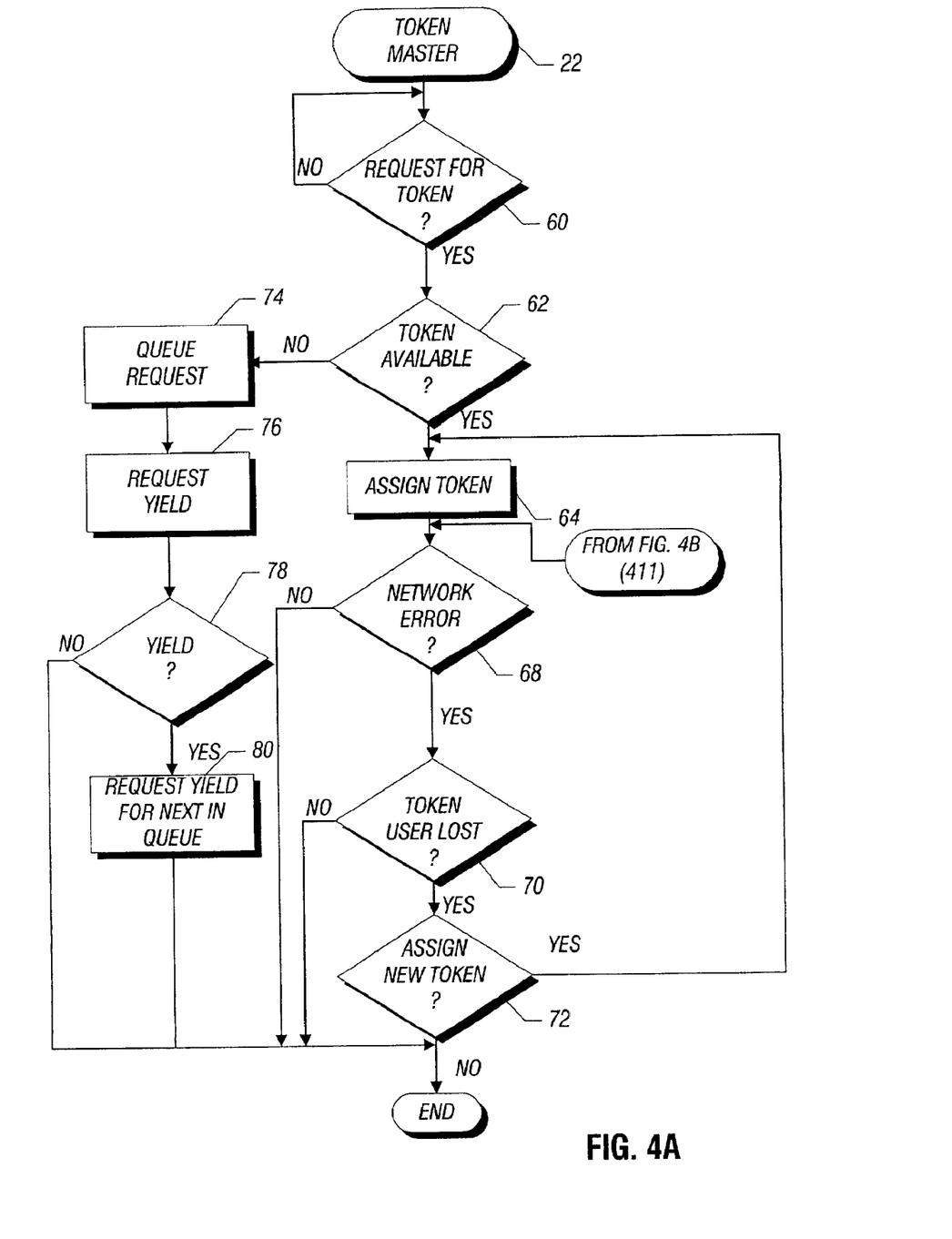
FIG. 4A is a flow chart for software for implementing a token master in accordance with one embodiment of the present invention.
Figure 4B:
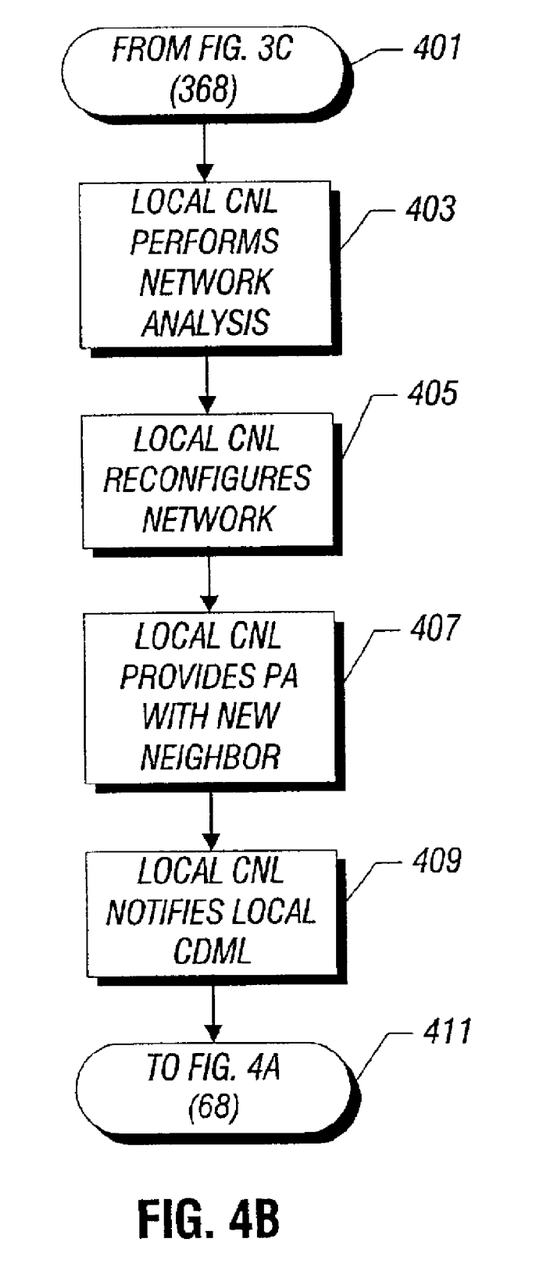
FIG. 4B is a flow chart for software for implementing network error processing by the cluster network layer in accordance with one embodiment of the present invention.

Referring to FIGS. 4A and 4B, the operation of the CDML master 20 software 22 begins with the receipt of a request for a token from a token requester 24, as indicated in diamond 60. When the master 20 receives a request for a token, it checks to determine whether the token is available, as indicated in diamond 62. If so, the master may then request a yield to the next requester in the queue, as indicated in block 64.

A check at diamond 68 determines whether a network error has occurred. Again, one type of network error may be the loss of a controller 106 which is recognized by the PA, reported to and processed by the local CNL. If so, then the local CNL 16 performs a network analysis 403 and reconfigures the network 405. The CNL 16 then provides the PA 28 with the new neighbor 407 and notifies the CDML 14 of the error 409. The CDML 14 also requests the array management layer 12 to perform an array analysis for each affected array. The CDML 14 checks at diamond 70 to determine whether the token user has been lost. If so, a new token is assigned, if possible, as indicated in diamond 72. As discussed above, should a token for an array have been lost and a master for that array not be available due to the network failure, a new token will not be assigned and that array may be set to an offline condition. The local CNL 16 may then notify all other CNLs of the network failure and they may reconfigure their associated controllers as required. For example, the CNLs may inform their associated PA of the new neighboring controller and detecting that the CDML token master may have changed for an array.

If a token was not available, as determined at diamond 62, the request for the token may be queued, as indicated in block 74. The master 20 may then request that the current holder of the token yield to the new requester, as indicated in block 76. A check at diamond 78 determines whether the yield has occurred. If so, the token may then be granted to the requester 24 that has waited in the queue for the longest time, as indicated in block 80.

Figure 5:
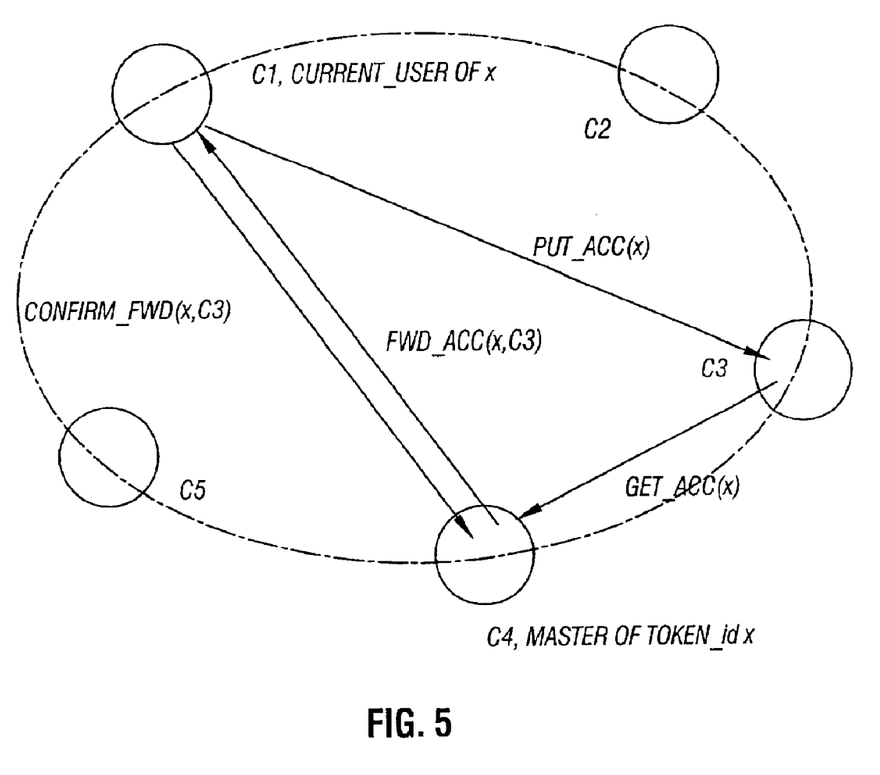
FIG. 5 is a depiction of a network in accordance with one embodiment of the present invention.

Referring to FIG. 5, a network may include a series of controllers C1 through C5. In this case, a controller C3 may make a request for an access token (GET_ACC(x)) from the controller C4 which is the master of a desired token. The current user of the token is the controller C1. In such case, the master C4 may forward the access request to the current user C1 and may receive a confirmation from C1. If the current user C1 is willing to yield, it can transfer the token to the controller C3. In such case, only three controllers 106 need to communicate in order to transfer the desired token.

Figure 6:
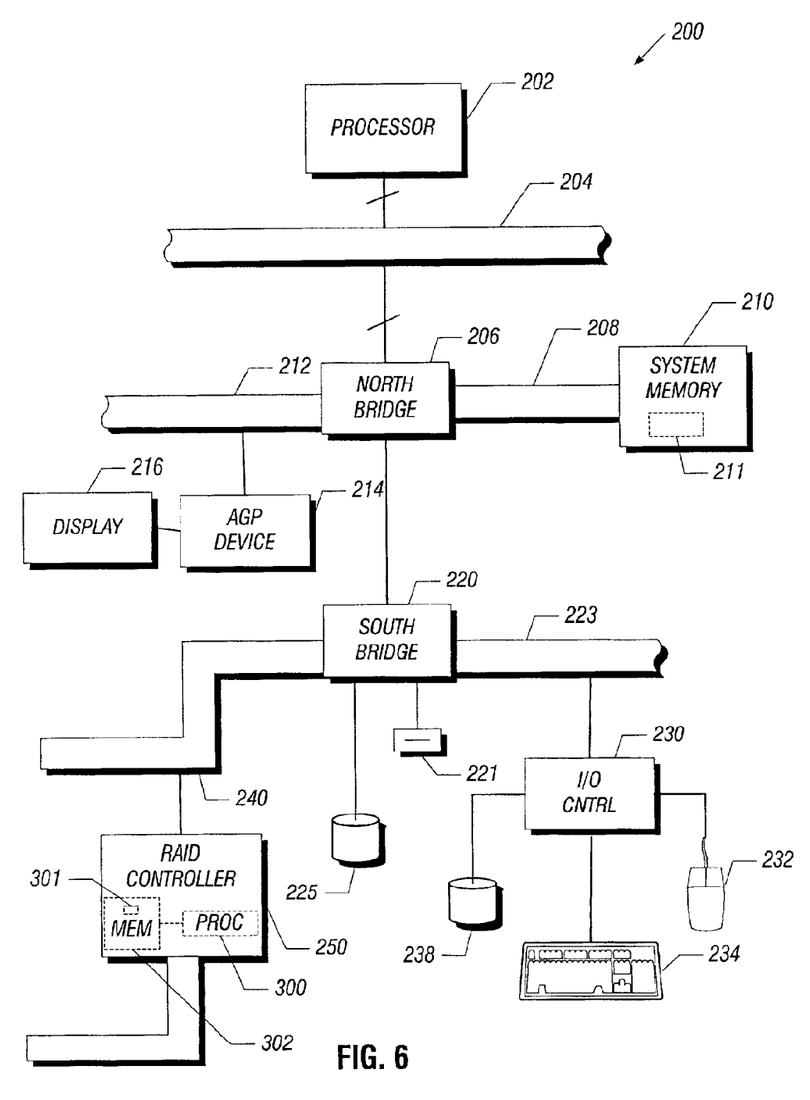
FIG. 6 is a schematic depiction of one embodiment of the present invention.

In some embodiments of the present invention, the server 102 may be a computer, such as exemplary computer 200 that is depicted in FIG. 6. The computer 200 may include a processor (one or more microprocessors, for example) 202, that is coupled to a local bus 204. Also coupled to local bus 204 may be, for example, a memory hub, or north bridge 206. The north bridge 206 provides interfaces to the local bus 204, a memory bus 208, an accelerated graphics port (AGP) bus 212 and a hub link. The AGP bus is described in detail in the Accelerated Graphics Port Interface Specification, Revision 1.0, published Jul. 31, 1996 by Intel Corporation, Santa Clara, Calif. A system memory 210 may be accessed via the system bus 208, and an AGP device 214 may communicate over the AGB bus 212 and generate signals to drive a display 216. The system memory 210 may store various program instructions such as the instructions described in connection with FIGS. 3A, 3B, 4A and 4B. In this manner, in some embodiments of the present invention, those instructions enable the processor 202 to perform one or more of the techniques that are described above.

The north bridge 206 may communicate with a south bridge 210 over the hub link. In this manner, the south bridge 220 may provide an interface for the input/output (I/O) expansion bus 223 in a peripheral component interconnect (PCI) bus 240. The PCI specification is available from the PCI Special Interest Group, Portland, Oreg. 97214. An I/O controller 230 may be coupled to the I/O expansion bus 223 and may receive inputs from a mouse 232 and a keyboard 234 as well as control operations on a floppy disk drive 238. The south bridge 220 may, for example, control operations of a hard disk drive 225 and a compact disk read only memory (CD-ROM) drive 221.

A RAID controller 250 may be coupled to the bus 240 to establish communication between the RAID array 104 and the computer 200 via bus 252, for example. The RAID controller 250, in some embodiments of the present invention, may be in the form of a PCI circuit card that is inserted into a PCI slot of the computer 200, for example.

In some embodiments of the present invention, the RAID controller 250 includes a processor 300 and a memory 302 that stores instructions 310 such as those related to FIGS. 3A, 3B and 4. In this manner, in some embodiments of the present invention, those instructions enable the processor 300 to perform one or more of the techniques that are described above. Thus, in these embodiments, the processor 300 of the RAID controller 250 performs the RAID-related functions instead of the processor 202. In other embodiments of the present invention, both the processor 202 and the processor 300 may perform different RAID-related functions. Other variations are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

sending an interrogation signal from a first storage controller of a plurality of storage controllers to another storage controller in said plurality of storage controllers to determine if said another storage controller is active;

if said another controller is not active, the first storage controller determining storage devices accessible to the first storage controller;

examining a storage RAID array to determine, at least in part, if data in the storage RAID array is accessible to the first storage controller; and determining, in part, if a storage device in the storage RAID array has failed.

2. The method of claim 1 including examining a response, if any, from another storage controller to determine, in part, if the other storage controller is active.

3. The method of claim 1 including sending an interrogation signal to a neighboring storage controller.

4. The method of claim 1 including examining a storage array to determine, at least in part, if data in the storage array is accessible to the first storage controller.

5. The method of claim 4 including indicating, in part, that data in a storage array is not accessible to the first storage controller.

6. An article comprising a computer readable storage medium storing instructions that, if executed, enable a processor-based system to:

send an interrogation message from a first storage controller of a plurality of storage controllers to another storage controller of said plurality of storage controllers to determine if said another storage controller is active;

if said another storage controller is not active, determine storage devices accessible to said first storage controller;

examine a storage array to determine, at least in part, if data in the storage RAID array is accessible; and determine, in part, if a storage device in the storage RAID array has failed.

7. The article of claim 6 wherein said medium stores instructions that, if executed, enable the processor-based system to examine a response, if any, from a storage controller to determine, in part, if the storage controller is not active.

8. The article of claim 6 wherein said medium stores instructions that, if executed, enable the processor-based system to send an interrogation signal to a neighboring storage controller.

9. A processor-based system comprising:

a processor; and a storage coupled to said processor stating instructions that, if executed, enable the processor to send an interrogation signal to a storage controller of a first plurality of storage controllers to determine if said controller is active;

determine, at least in part, if data stored in a storage RAID array is accessible; and determine, in part, if a storage device in the storage RAID array has failed.

10. The system of claim 9, wherein said storage stores instructions that, if executed, enable the processor to examine a response, if any, from a storage controller to determine, in part, if the storage controller is not active.

11. The system of claim 9, wherein said storage stores instructions that, if executed, enable the processor to send an interrogation signal to a neighboring storage controller.

12. A method comprising:

sending an interrogation signal from a first storage controller of a plurality of storage controllers to another storage controller in said plurality of storage controllers to determine if said another storage controller is active;

if said another controller is not active, the first storage controller determining storage devices accessible to the first storage controller;

examining a storage RAID array to determine, at least in part, if data in the storage RAID array is accessible to the first storage controller;

determining, in part, if a storage device in the storage RAID array has failed;

examining a storage array to determine, at least in part, if data in the storage array is accessible to the first storage controller, and indicating, in part, that data in a storage array is not accessible to the first storage controller.

* * * * *

UNITED STATES PATENT AND TRADEMARK OFFICE
CERTIFICATE OF CORRECTION

PATENT NO. : 6,934,878 B2
DATED : August 23, 2005
INVENTOR(S) : Dieter Massa and Otto Lehner It is certified that error appears in the above-identified patent and that said Letters Patent is hereby corrected as shown below:

<u>Column 8</u>
Line 23, "stating" should be -- storing --.

Signed and Sealed this

Twenty-seventh Day of December, 2005

JON W. DUDAS
*Director of the United States Patent and Trademark Office*